United States Patent
Schumacher

(10) Patent No.: US 6,421,953 B1
(45) Date of Patent: Jul. 23, 2002

(54) PUTTING GREEN CONDITIONER

(76) Inventor: James Schumacher, 1665 N. Old Dixie Hwy., Suite A, Jupiter, FL (US) 33469

( * ) Notice: Subject to any disclaimer, the term of this patent is extended or adjusted under 35 U.S.C. 154(b) by 34 days.

(21) Appl. No.: 09/668,044

(22) Filed: Sep. 21, 2000

(51) Int. Cl.$^7$ ................................................ A01C 1/00
(52) U.S. Cl. ................................................ 47/1.01 F
(58) Field of Search .................... 47/1.01 R, 1.01 F, 47/58.1; 405/43; 165/45

(56) References Cited

U.S. PATENT DOCUMENTS

| | | | |
|---|---|---|---|
| 1,604,189 A | * 10/1926 | Nelson | 47/1.01 R |
| 1,612,827 A | * 1/1927 | Moore | 237/46 |
| 1,858,330 A | * 5/1932 | Horning | 47/142 |
| 1,904,001 A | * 4/1933 | Kimmel | 47/1.01 R |
| 1,967,803 A | * 7/1934 | Boland | 405/40 |
| 1,991,851 A | * 9/1935 | Hammell | 47/58.1 |
| 2,947,109 A | * 8/1960 | Davis, Sr. et al. | 47/1.01 R |
| 3,200,539 A | * 8/1965 | Kelly | 47/1.01 R |
| 3,470,943 A | * 10/1969 | Van Husen | 165/45 |
| 3,875,996 A | * 4/1975 | Kohorn et al. | 165/48.1 |
| 3,882,383 A | * 5/1975 | Matlin | 324/696 |
| 4,348,135 A | * 9/1982 | Clair | 405/36 |
| 4,437,263 A | * 3/1984 | Nir et al. | 47/1.01 R |
| 5,052,855 A | * 10/1991 | Chapman et al. | 405/36 |
| 5,120,158 A | * 6/1992 | Husu | 405/43 |
| 5,306,317 A | 4/1994 | Yoshizaki | |
| 5,368,092 A | * 11/1994 | Rearden et al. | 165/45 |
| 5,507,595 A | * 4/1996 | Benson | 405/43 |
| 5,542,208 A | * 8/1996 | Benson | 47/1.01 R |
| 5,590,980 A | 1/1997 | Daniel | |
| 5,596,836 A | * 1/1997 | Benson | 47/1.01 R |
| 5,617,670 A | * 4/1997 | Benson | 47/1.01 R |
| 5,634,294 A | * 6/1997 | Rohoza | 47/58 |
| 5,636,473 A | 6/1997 | Benson | |
| 6,220,957 B1 | * 4/2001 | Clarkson | 454/256 |

\* cited by examiner

Primary Examiner—Peter M. Poon
Assistant Examiner—Jordan Lofdahl
(74) Attorney, Agent, or Firm—McHale & Slavin, P.A.

(57) ABSTRACT

A system for modifying the surface temperature and/or relative humidity of golf greens or other grass playing fields by applying temperature controlled air and/or a water mist through pop-up nozzles. The nozzles are controlled by a central control panel which activates the nozzles based on input from temperature sensitive probes in the greens.

18 Claims, 3 Drawing Sheets

PUTTING GREEN CONDITIONER

FIELD OF THE INVENTION

This invention relates to agronomy, in general, and golf course greens keeping, specifically. One of the most important elements of golf course management is the health of the putting greens. In attempting to maintain the most luxurious growth of grass, close attention is paid to watering and feeding of the greens. However, very little has been done in the area of temperature control, other than watering, even though it is well known that each species of greens grass has an optimum temperature range for best results. This invention provides a system by which the surface temperature of the grass may be changed from the ambient temperature without introducing other deleterious agents.

BACKGROUND OF THE INVENTION

Temperature control, or cooling, of the golf greens has conventionally been a by-product of watering. However, in the hotter climates or in the hotter parts of the summer, temperature control would require too much water for healthy growth of the grass. Too much water, particularly in high humidity conditions, may create a continuous wet environment more favorable to fungi, mildew, or other deleterious agents. Whereas watering during the heat of the day affects the subsoil which damages the root system of the grass. Therefore, watering, alone, can not be used to control temperature for a sustained period of time.

Large fans, located adjacent the greens, have been employed to control humidity and temperature by moving the air across the green. Any cooling effects are directly related to evaporation and in a high relative humidity environment there is little evaporation. In the situation where there is a low humidity heat, there is no water vapor to evaporate. This amounts to a hot dry wind which dries out the subsoil quicker than normal. In addition to the substantial breeze created by the fans, the noise produced is a distraction to the players.

The art of greens keeping lacks a system which can be used continuously in all high heat and high or low humidity conditions to control the temperature of the air directly above the green without deleterious side effects.

DESCRIPTION OF THE PRIOR ART

There are numerous devices for affecting the temperature of golf course greens. U.S. Pat. Nos. 5,596,836; 5,617,670; and 5,636,473 to Benson disclose an underground system for delivering treated air to the subsoil of a green. The operation of these devices depend on the specific preparation of the subsoil for their operation. This includes installation of a gravel bed under the green as part of the site preparation. The treated air is delivered underground and percolates upwardly through the gravel bed and the sod to achieve its desired result. U.S. Pat. No. 5,590,980 to Daniel discloses an underground system of conduits connected to a vacuum pump and reservoir to control the moisture content of the green through drainage. Yoshizaki, U.S. Pat. No. 5,306,317 uses an underground conduit system and a boiler for heating the soil for optimum growth. Rearden et al, U.S. Pat. No. 5,368,092, discloses a subsurface array of tubes for circulating a temperature controlling fluid and a temperature sensor for control of the device.

All of these devices attempt to influence the surface temperature of the green from subterranean application of the temperature altering agents. The intervening layers of earth and/or gravel would clearly act as a heat sink and detract from effectiveness of these agents on the upper surface of the grass.

SUMMARY OF THE INVENTION

A system for modifying the surface temperature and/or relative humidity of golf greens or other grass playing fields by applying temperature controlled air and/or a water mist through pop-up nozzles. The nozzles are controlled by a central control panel which activates the nozzles based on input from temperature sensitive probes in the greens.

Accordingly, it is an objective of the instant invention to teach the application of temperature controlling agents directly to the upper surface of the grass.

It is a further objective of the instant invention to teach the use of a temperature controlled air flow upon the surface of the grass which may be applied continuously without injury to the grass.

It is yet another objective of the instant invention to teach a system of providing temperature controlled air flow through an array of distribution lines which include the temperature and humidity modification of ambient air and delivery to the upper surface of the green. The system may be controlled by temperature sensitive probes inserted in the sod.

It is a still further objective of the invention to provide a particular nozzle construction for applying the temperature controlled air flow wherein the nozzle is displaced from an at-rest position within the sod to an activated position above the grass. The displacement of the nozzle may be accomplished by air flow.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE INVENTION

Figure 1:
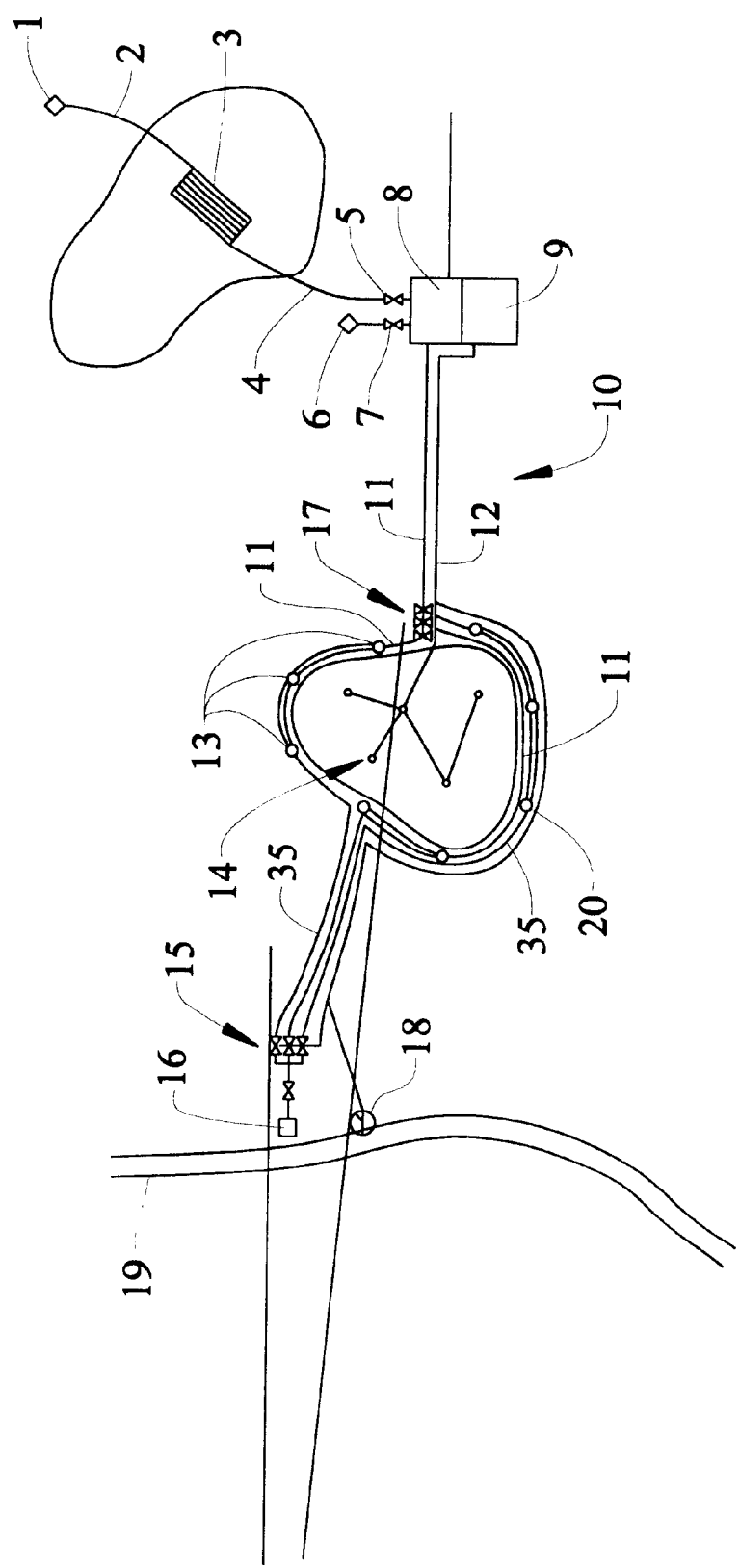
FIG. 1 is a schematic of the system of this invention.

The overall view of the system 10, shown in FIG. 1, includes the features of a golf course. In this instance, a lake is a part of the golf course either as a source of irrigation water or an obstacle for the golfers or both. The deeper water in the lake has a naturally occurring, nearly constant, temperature which is below the ambient air temperature during the growing season. In the embodiment illustrated, the lake is the medium within which the radiator 3 is immersed. Of course, the radiator could be submerged in any fluid medium with a preselected temperature, such as a container of ice water or, in colder climates, a container of warm water. The fluid medium includes gases also, e.g. the radiator could be placed in a cavern or ice house. The temperature of the entrained air within the radiator coil is the result of the heat exchange through the radiator tubing. As shown, the radiator 3 is a rectilinear array of tubing but it can take any form, such as circular, to create a large surface area of tubing for increased heat exchange.

Atmospheric air is drawn into the inlet 1 of line 2 and passes through radiator 3 by the operation of the air pump 8. Once the air has been temperature modified by the radiator, the remainder of the lines in the system are either buried or insulated or both.

The pump 8 may be reciprocal or rotary with an inlet line 4 carrying the temperature modified air through the system for distribution to the greens by line 11. Inlet line 4 has an inlet valve 5 for controlling the inlet air flow. Another air inlet 6 is located on the air pump 8 for entraining air to operate the nozzles 20 through manifold 17. Line 6 also has an on-off valve 7 for control of ambient air flow. A compressor (not shown) is operatively connected with the nozzles 20 to provide motive force for moving the nozzles from an at-rest position to an activated position. A supply line 29 for pressurized air connects the compressor and the nozzles. The compressor may or may not use preconditioned air.

The system may also be connected to the irrigation system 16 of the golf course. The irrigation system has a manifold 15 which connects with the nozzles 20. The manifold is controlled by the control panel 9 and line 12.

The system is operated through a control panel 9 which includes conventional air pressure gauges; air temperature gauges, both ambient and system; soil temperature gauges, both ambient and system; on/off control switches, both air alone and air and water; sensors, both temperature and humidity; a timer and a computer or CPU (none shown).

In a program mode, the sensor probes 14 which are placed in the soil of the greens give a reading of the temperature and humidity conditions existing on each green. In the program mode, air, only ; humidity, only; or both may be selected. If either or both of these conditions exceed a programmed preset limit, for any green, the CPU activates the system to produce temperature modified air flow, with or without humidity modification. The treatment may be a timed period or it may continue until the conditions fall within the preset limits.

As shown, in FIG. 1, there may be several probes 14 placed in each green. The CPU may activate the system based on the average of these readings or on the highest or on the lowest. The CPU may be programed to read only the temperature or humidity or the heat index based on both.

In a timed mode, the system may activate any combination of greens at a particular time for a particular period for temperature or humidity control or both.

As shown in FIG. 1, there is a golfer delay switch 18 located near the golf cart path 19. This allows the treatment of the greens to be temporarily interrupted during play. The switch 18 includes a timer which may be fixed or adjustable. For example, in the fixed mode, the air and/or water treatment of the green would cease for a short period, such as 5 minutes, the switch is activated, then resume. When the cooler air, alone, is being delivered to the greens, the switch 18 may be deactivated.

Figure 2:
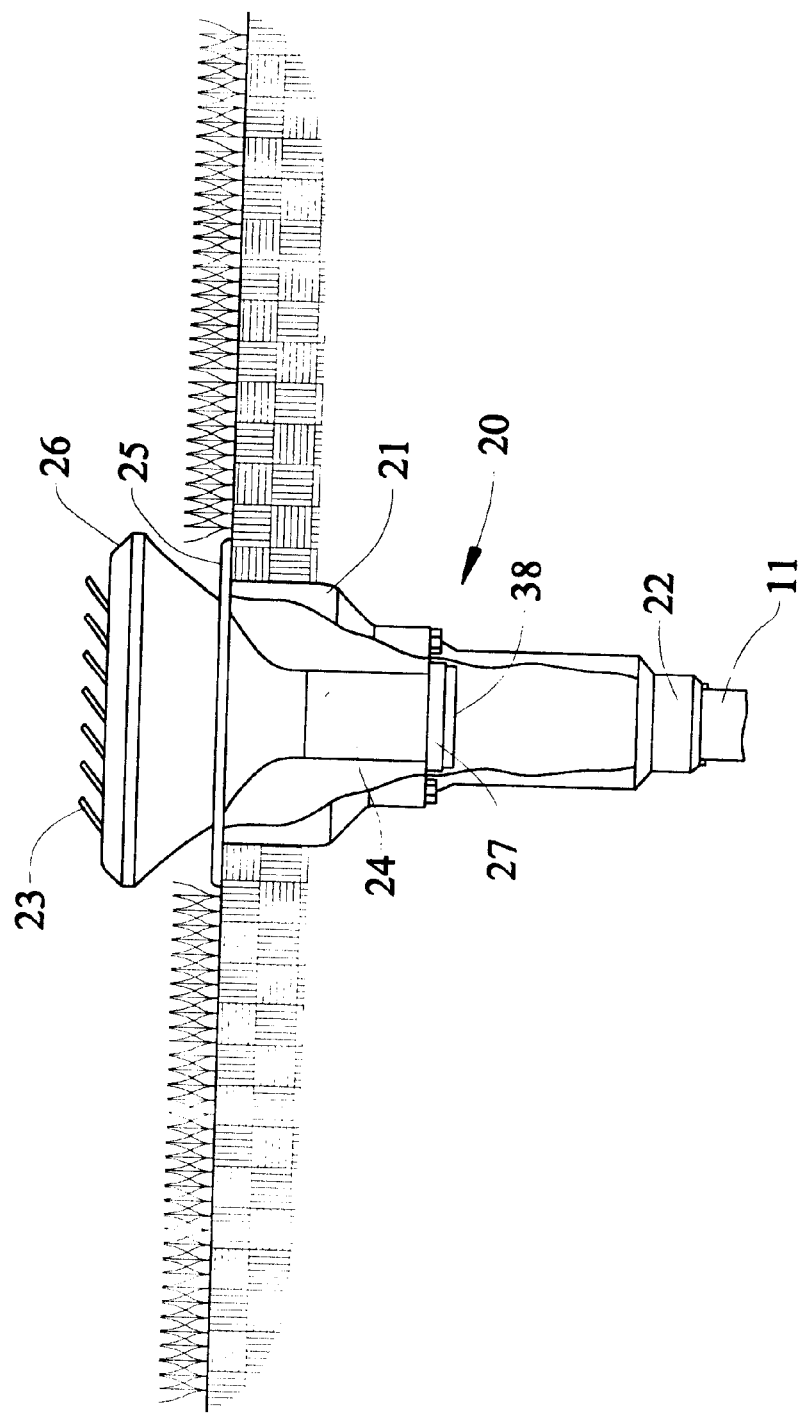
FIG. 2 is a cross section of a nozzle of this invention in the activated position showing louvers for directing air flow.

The nozzle 20 shown in FIG. 2 in the activated position is extended upwardly out of the housing 21 and has open louvers 23 directing the temperature modified air parallel to the ground just above the grass. The louvers are pivotally mounted in the nozzle in such a way that the flow of conditioned air will open the passageway. The nozzle 20 has a bell shaped upper portion 26 carrying the louvers. The bell shaped portion continues into a tubular portion 24 which telescopes into a tubular housing extension in the at-rest position. The tubular portion 24 reciprocates through an annular collar 27 which acts as a guide for the movement. The collar 27 also forms the reaction surface for the return spring 28. The other end of the return spring 28 is captured by the collar 38 at the lower end of the tubular portion 24. The compressed return spring 28 expands to return the nozzle to the at-rest position when the system is inactive. The flange 25 surrounding the mouth of the housing is located at ground level and acts as a stop for the downward movement of the nozzle 20. The lower tubular extremity of the housing 21 has a connection 22 for the conditioned air distribution line 11.

Figure 3:
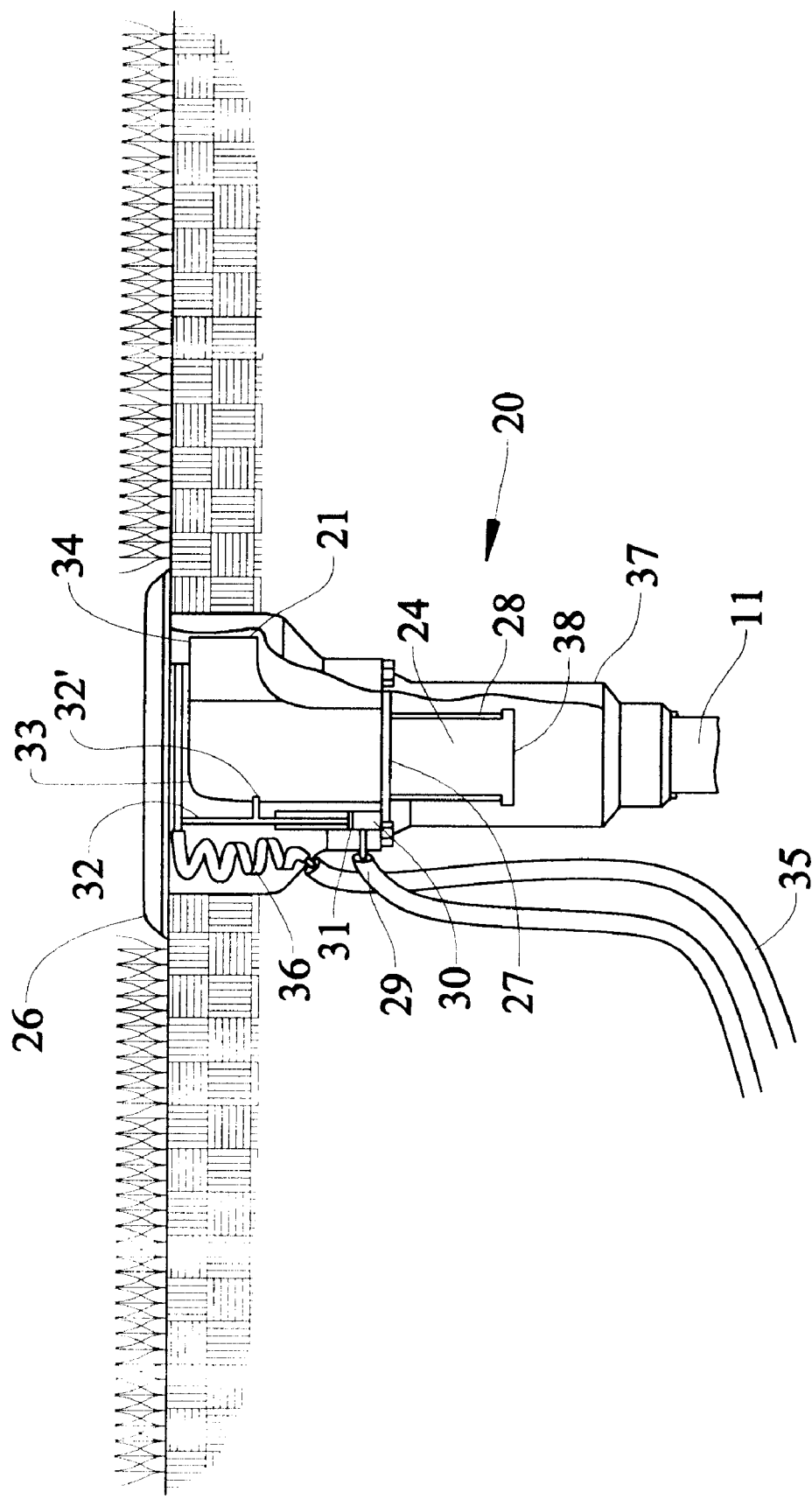
FIG. 3 is a cross section of a nozzle of this invention in the at-rest position showing the air activation mechanism.

In FIG. 3, the nozzle, in the at-rest position, is broken away to show the other working elements. The return spring 28 is extended and upper portion 26 of the nozzle is in contact with flange 25. Since no air is circulating, the louvers 23 are closed. The nozzles 20 are activated by high pressure air supplied by line 29 into cylinder 30. The high pressure air moves the piston 31 and piston rod 32 to raise the upper portion of the nozzle. The piston rod 32 has an attachment 32' connected to a control arm 33 attached to the misting nozzle 34.

The misting nozzle 34 is connected to water line 35. Inside housing 21 there is an excess 36 of water line 35 to accommodate the movement of the misting nozzle. The pressure in this water line may be adjusted to give a fine spray for humidity control without flooding the green.

As shown in FIG. 1, some of the nozzles 13 around a green may not be connected to the irrigation system 16.

In the program mode, the sensors 14 signal the control panel 9 that a green or greens is/are out of parameters of temperature or humidity or both, the control panel signals the air pump 8 and compressor to activate some or all of the nozzles 20 around the affected greens. Temperature adjusted air begins to flow and compressed air is delivered to raise each nozzle. If a humidity parameter is selected, the control panel signals the water system to supply water to each activated nozzle. This activated condition will continue either until the sensors show each green is within parameters or for a preselected period of time.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A system for treating the playing surface of a sod athletic field to adjust the temperature of said surface comprising a source of low pressure, high volume air flow, a radiator for adjusting the temperature of said air flow having an intake and an exhaust, said intake connected to said source, said exhaust connected to a distribution line, said line connected to at least one nozzle, said nozzle adapted to be located adjacent said field and being movable between an at-rest position on said surface and an activated position above said surface, said air flow exiting said nozzle in said activated position to provide a thin layer of air above said surface at a preselected temperature wherein said source is connected to a manual time delay switch, said time delay switch adjustable to preselected periods of time, said time delay switch adapted to be located said sod athletic field whereby said air flow may be temporarily halted manually and automatically resume after a preselected period of time.

2. A system of claim 1 wherein said radiator is adapted to be disposed in a medium having a certain temperature, said radiator providing heat transfer for said air flow through said radiator thereby adjusting said air flow to said certain temperature.

3. A system of claim 2 wherein said radiator comprises a coil structure which increases the surface area of said radiator in said medium.

4. A system of claim 1 wherein said line is connected to a plurality of nozzles.

5. A system of claim 1 wherein said sod athletic field is a golf green.

6. A system of claim 1 wherein said system includes an air compressor, said air compressor connected to said at least one nozzle by a high pressure activation line for moving said nozzle from the at-rest position to said activated position, said high pressure activation line controlled by an activation valve.

7. A system of claim 1 wherein said athletic field contains a water irrigation system, said at least one nozzle is adapted to be connected to said water irrigation system, said nozzle having a mist nozzle for distributing a spray of small water droplets in said activated position, said mist nozzle controlled by a misting valve.

8. A system of claim 1 wherein said source is connected to a temperature sensitive probe, said probe connected to a switch adjustable to a preselected temperature, said probe adapted to be disposed in said sod athletic field, said switch responsive to a preselected temperature to move said nozzle from said at-rest position to said activated position.

9. A system of claim 1 wherein said source is connected to a manual time delay switch, said time delay switch adjustable to preselected periods of time, said time delay switch adapted to be located adjacent said sod athletic field whereby said air flow may be temporarily halted manually and automatically resumes after a preselected period of time.

10. A system for use on a golf course to treat the playing surface of a golf green to adjust the temperature, said system having an inlet drawing in atmospheric air, said inlet connected to a radiator adapted to be located in a medium having a certain temperature, said radiator providing heat exchange between said medium and said atmospheric air to modify the temperature of said air, a powered source of air flow having an entry and an exhaust, a radiator line connected to said radiator for conveying said temperature modified air flow from said radiator to said entry of said powered source of air flow, a manifold connected at one end to said exhaust of said powered source of air flow and having a plurality of outlet connections, said outlet connections connected to a plurality of nozzles adapted to be located adjacent to said green, said nozzles having an at-rest position adapted to be on the surface of said green and an activated position adapted to be above said surface, said nozzles having movable directional control surfaces for vectoring of said temperature modified air, said powered source of air flow includes a compressor, said compressor connected to an activating manifold, said activating manifold having a plurality of outlets, a plurality of activating air lines having first ends connected to said plurality of outlets of said activating manifold and the other ends connected to said plurality of nozzles, said activating air lines providing motive force to move said nozzles from said at-rest position to said activated position, said golf course includes an irrigation system, said plurality of nozzles having spray heads, said spray heads adapted to be connected to said irrigation system through a valved line, said valved lines having an open and closed position, said spray heads providing a fine mist of water droplets when said valved lines are open wherein said spray heads are connected to a manual time delay switch for controlling said valved lines, the amount of time delay being adjustable whereby said mist can be interrupted for play on the green.

11. A system of claim 10 wherein said powered source of air flow includes a plurality of temperature sensitive probes for initiating said powered source, said probes adapted to be placed on said green, said probes having an initiating switch for preselecting a certain temperature, said switch initiating said powered source of air flow when said probes senses said preselected temperature.

12. A system for use on a golf course to treat the playing surface of a golf green to adjust the temperature, said system having an inlet drawing in atmospheric air, said inlet connected to a radiator adapted to be located in a medium having a certain temperature, said radiator providing heat exchange between said medium and said atmospheric air to modify the temperature of said air, a powered source of air flow having an entry and an exhaust, a radiator line connected to said radiator for conveying said temperature modified air flow from said radiator to said entry of said powered source of air flow, a manifold connected at one end to said exhaust of said powered source of air flow and having a plurality of outlet connections, said outlet connections connected to a plurality of nozzles adapted to be located adjacent to said green, said nozzles having an at-rest position adapted to be on the surface of said green and an activated position adapted to be above said surface, said nozzles having movable directional control surfaces for vectoring of said temperature modified air, said powered source of air flow includes a compressor, said compressor connected to an activating manifold, said activating manifold having a plurality of outlets, a plurality of activating air lines having first ends connected to said plurality of outlets of said activating manifold and the other ends connected to said plurality of nozzles, said activating air lines providing motive force to move said nozzles from said at-rest position to said activated position, said golf course includes an irrigation system, said plurality of nozzles having spray heads, said spray heads adapted to be connected to said irrigation system through a valved line, said valved lines having an open and closed position, said spray heads providing a fine mist of water droplets when said valved lines are open wherein said irrigation system includes a water reservoir and said radiator is submerged in said reservoir.

13. A system of claim 12 wherein said powered source of air flow includes a plurality of temperature sensitive probes for initiating said powered source, said probes adapted to be placed on said green, said probes having an initiating switch for preselecting a certain temperature, said switch initiating said powered source of air flow when said probes senses said preselected temperature.

14. A nozzle assembly for treating the playing surface of a sod athletic field comprising a housing adapted to be embedded below said playing surface, said housing having an open end adapted to be disposed at said playing surface, said housing having a plurality of connectors below said playing surface, one of said connectors adapted to connect to a high flow, low pressure air flow, said housing enclosing a nozzle, said nozzle being movable between an at-rest position and an activated position, said nozzle having a proximal end disposed in said housing and a distal end disposed at said open end outside said housing, said distal end of said nozzle including movable louvers closing said nozzle, said louvers adapted to open in said activated position in response to a high flow, low pressure air flow, said louvers of said distal end closing said open end of said housing in said at-rest position.

15. A nozzle assembly of claim 14 wherein said distal end of said nozzle is displaced from said open end of said housing in said activated position and adapted to be disposed above said playing surface.

16. A nozzle assembly of claim 15 wherein said proximal end of said nozzle and said housing are connected by a retract spring, said retract spring operating to displace said distal end of said nozzle to close said open end of said housing in said at-rest position.

17. A nozzle assembly of claim 16 wherein another of said connectors includes a cylinder mounted inside said housing, said cylinder having a piston enclosed therein, said piston having an arm extending from said cylinder and contacting said distal end of said nozzle, said connector is adapted to connect a high pressure air line whereby high pressure air moves said piston in said cylinder extending said piston arm to displace said distal end of said nozzle.

18. A nozzle assembly of claim 17 wherein a third connector in said housing is adapted to connect to a water line, said housing having a spray head mounted at the open end of said housing, said spray head connected to said third connector.

* * * * *